US006072800A

United States Patent [19]
Lee

[11] Patent Number: 6,072,800
[45] Date of Patent: Jun. 6, 2000

[54] WEIGHTED LONGEST QUEUE FIRST ADAPTIVE SCHEDULING DISCIPLINE FOR ATM NETWORKS

[75] Inventor: Duan-Shin Lee, Princeton Junction, N.J.

[73] Assignee: NEC USA, Inc., Princeton, N.J.

[21] Appl. No.: 08/912,372

[22] Filed: Aug. 18, 1997

[51] Int. Cl.$^7$ .................................................. H04L 12/28
[52] U.S. Cl. ........................ 370/412; 370/465; 370/230; 370/235
[58] Field of Search .............................. 710/56; 370/412, 370/468, 465, 414, 416, 418, 235, 229, 230, 232, 233, 234

[56] References Cited

U.S. PATENT DOCUMENTS

| | | | |
|---|---|---|---|
| 5,268,900 | 12/1993 | Hluchyj et al. | 370/429 |
| 5,291,481 | 3/1994 | Doshi et al. | 370/230 |
| 5,864,538 | 1/1999 | Chong et al. | 370/235 |
| 5,864,540 | 1/1999 | Bonomi et al. | 370/235 |
| 5,870,629 | 2/1999 | Borden et al. | 395/864 |

OTHER PUBLICATIONS

R.M. Loynes, "The Stability of a Queue with Non–Independent Inter–Arrival and Service Items," Nov. 1960, revised Jul. 1961, pp. 497–520.

J.W. Cohen, "A Two–Queue, One–Server Model with Priority for the Longer Queue," *Queuing Systems* 2(1987), pp. 261–283.

W. Szpankowski, "Stability Conditions for Multidimensional Queuing Systems with Computer Applications," *Operations Research*, vol. 36, No. 6 (Nov.–Dec. 1988), pp. 944–957.

S. Panwar, et al. "Optimal Scheduling Policies for a Class of Queues with Customer Deadlines to the Beginning of Service," *Journal of the Association for Computing Machinery*, vol. 35, No. 4, Oct. 1988, pp. 832–844.

A. Demers, et al., "Analysis and Simulation of a Fair Queueing Algorithm" (1989), pp. 1–12.

L. Zhang, "VirtualClock: A New Traffic Control Algorithm for Packet–Switched Networks," *ACM Transactions on Computer Systems*, vol. 9, No. 2, May 1991, pp. 102–124.

R. Cruz, "A Calculus for Network Delay, Part I: Network Elements in Isolation," IEEE Transactions on Information Theory, vol. 37, No. 1, Jan. 1991, pp. 114–131.

R. Cruz, "A Calculus for Network Delay, Part II: Network Analysis," *IEEE Transactions on Information Theory*, vol. 37, No. 1, Jan. 1991, pp. 132–141.

S. Golestani, "Congestion–Free Communications in High–Speed Packet Networks," IEEE Transactions on Communications, vol. 39, No. 12, Dec. 1991, pp. 1802–1812.

H. Gail, et al., "Buffer Size Requirements Under Longest Queue First," *Performance of Distributed Systems and Integrated Communication Networks*, 1992, pp. 413–424.

(List continued on next page.)

*Primary Examiner*—Hassan Kizou
*Assistant Examiner*—Mitchell Slavitt
*Attorney, Agent, or Firm*—Sughrue, Mion, Zinn, Macpeak & Seas, PLLC

[57] ABSTRACT

Disclosed is a weighted longest queue first (WLQF) service discipline for ATM networks. The sources are classified so that sources in one class have the same cell loss probability requirement. For N classes of traffic the WLQF system has N buffers to store the traffic, wherein buffer i is assigned a positive number $w_i$ for the weight of buffer i. The scheduler transmits a cell from that buffer whose index maximizes $w_i Q_i$ for i=1, 2, ..., N, where $Q_i$ is the queue length of buffer i at the moment when the scheduler makes a decision about which buffer to serve. Accordingly, the inventive system always serves the most congested buffer relative to the weighted queue lengths, and can adapt to temporary overload quickly. This feature ensures that in temporary overloads of one of the buffers, the overloaded buffer, receives almost all the service and therefore, losses due to buffer overflows and cell delay variation (CDV) are much small. Additionally, when a call is received, the system determines whether it can provide the requested QoS, and rejects the call if not.

8 Claims, 3 Drawing Sheets

OTHER PUBLICATIONS

A. Parekh, "A Generalized Processor Sharing Approach to Flow Control in Integrated Services Networks: The Single–Node Case," IEEE/ACM Transactions on Networking, vol. 1, No. 3, Jun. 1993, pp. 344–357.

A. Parekh, "A Generalized Processor Sharing Approach to Flow Control in Integrated Services Networks: The Multiple–Node Case," IEEE/ACM Transactions on Networking, vol. 2, No. 2, Apr. 1994, pp. 137–150.

O. Yaron, et al., "Generalized Processor Sharing Networks with Exponentially Bounded Burstiness Arrivals," 1994 IEEE, pp. 628–634.

T. Takine, et al., "An Analysis of a Discrete–Time Queue for Broadband ISDN with Priorities among Traffic Classes," IEEE Transactions on Communications, vol. 42, No. 2/3/4, Feb/Mar/Apr 1994, pp. 1837–1845.

S. Golestani, "A Self–Clocked Fair Queueing Scheme for Broadband Applications," 1994 IEEE, pp. 636–646.

Z. Zhang, et al., "Statistical Analysis of the Generalized Processor Sharing Scheduling Discipline," IEEE Journal on Selected Areas in Communications, vol. 13, No. 6, Aug. 1995, pp. 1071–1080.-

WEIGHTED LONGEST QUEUE FIRST ADAPTIVE SCHEDULING DISCIPLINE FOR ATM NETWORKS

BACKGROUND OF THE INVENTION

1. Field of the Invention

The subject invention relates to Asynchronous Transfer Mode (ATM) networks and, more specifically, to a scheduling discipline in ATM networks which maintains the specified quality of service (QoS) while efficiently handles temporary congestion.

2. Description of the Related Art

The demand on communication networks continues to steadily increase, especially in view of the rapid advent in computing and semiconductor technology. Consequently, it is important to provide adequate traffic control on the networks so as to provide adequate service. The adequacy of service can be evaluated with reference to various parameters, such as the number of packets which get transmitted (i.e., the bandwidth), the speed in which the packets get transmitted, and the number of packets which get discarded (corresponding to the available buffer space).

Generally, the traffic control is implemented at two points. First, an algorithm is provided at each source for controlling the rate at which the source transmits its packets. These algorithms are designed to ensure that a free buffer is available at the destination host. Second, traffic is controlled at the gateways directly using virtual channels and indirectly using queuing. More specifically, routing algorithms directly control traffic by re-routing packets away from congested areas, while queuing algorithms indirectly control traffic by determining the order of servicing the buffers.

Since traffic can be controlled at the sources and at the switches, there may be a tendency to cause one point to rely heavily on the operation of the other. For example, a known prior art gateway traffic control uses a First-Come-First-Serve (FCFS) algorithm which causes the gateway traffic to be practically controlled by the sources. In such prior art systems, all users use the same buffer, so that QoS is the same for all users at the outset. However, the FCFS control is prone to violations by ill-behaved sources who may improve their performance at the expense of other users. For example, using sufficiently high speed transmission, a source can capture much of the available bandwidth, thereby reducing the bandwidth available to other sources. Thus, a philosophy has been developed in the prior art that a fair traffic control should not allow sources to use more than their fair share of the network resources. For example, one solution is to use leaky buckets at the periphery of the network.

A queuing prior art gateway traffic control has been developed in order to avoid abuse by ill-behaved sources. (See, e.g., J. Nagle, On Packet Switches with Infinite Storage, RFC 896, 1985 and J. Nagle, On Packet Switches with Infinite Storage, IEEE Transactions on Communications, Volume 35, pp 435–438, 1987.) According to such prior art systems, the individual sources are given separate queues and the queues are serviced in a round-robin manner. Thus, each source is served in its turn. Therefore, sources with high transmission rate only increase their own queue and do not degrade the service to other sources. However, while such a system may be adequate when all the packets are of the same length, it would favor sources having long packet length over those having short packet length. Additionally, irrespective of packet length, such a system is oblivious to promptness needs of the various sources. consequently an unacceptably high number of packets may be discarded when the promptness requirement is not satisfied by the network.

It is therefore seen that a major design challenge of Asynchronous Transfer Mode (ATM) networks is to be able to efficiently provide the quality of service (QoS) specified by the customers, while avoiding bottlenecks and maintaining fairness (of course, the definition of "fair" may differ from implementation to implementation). To achieve this goal, a well designed scheduling discipline and connection admission control (CAC) algorithm must be implemented in the network switches. Such a scheduling discipline should preferably account for transmission length and immediacy.

For example, certain applications require that the packet be serviced within a given time, or it will be useless to the receiver. Such applications include transmission of voice or video packets over packet-switched networks. Notably, for proper voice communication, the packet transmission delay should be no longer than about 300 ms. Accordingly, for efficient and responsive system, the traffic control should account for the immediacy of the transmission.

To account for immediacy of transmission, an available class of prior art scheduling disciplines handle queues with customers that have deadlines. It is shown by S. Panwar, D. Towsley, and J. Wolf, Optimal Scheduling Policies for a Class of Queues with Customer Deadlines to the Beginning of Services, Journal of ACM, Vol. 35, No. 4, pp. 832–844, 1988, that the shortest time to extinction (STE) policy is optimal to schedule customers with deadlines. According to the STE policy, the customer closest to its deadline is given priority. Similar scheduling is known as Earliest Due Date (EDD), although the STE is different in that it never schedules tasks that are past their due date. However, this class of scheduling algorithms has not considered the users' QoS nor the CAC algorithms. Moreover, the STE and EDD algorithms are very complicated to implement and require much processing time. Consequently, these scheduling methods are not suitable for fast ATM networks, especially if the network is to guarantee the requested QoS.

Recently, rate based scheduling disciplines, such as generalized processor sharing and weighted fair queuing, have received a lot of attention. See, for example, A. Demers, S. Keshav, and S. Shenker, Analysis and simulation of a fair queuing algorithm" J. Internetworking: Res. Exper., Vol. 1, pp. 3–26, 1990; A. Parekh and R. Gallager, A generalized processor sharing approach to flow control in integrated services networks: The single-node case, IEEE Trans. on Networking, Vol. 1, No. 3, pp. 344–357, 1993; 0. Yaron and M. Sidi, Generalized processor sharing networks with exponentially bounded burstiness arrivals, in IEEE Infocom '94, pp. 628–634, 1994; Z.-L. Zhang, D. Towsley, and J. Kurose, Statistical analysis of the generalized processor sharing scheduling discipline, IEEE Journal on Selected Areas in Communications, Vol. 13, No. 6, pp. 1071–1080, 1995; S. Golestani, A self-clocked fair queuing scheme for broadband applications, in IEEE Infocom '94, pp. 5c.1.1–5c.1.11, 1994; L. Zhang, A new traffic control algorithm for packet switched networks, ACM Transaction on Computer Systems, Vol. 9, No. 2, pp. 101–124, May 1991.

In the rate based schemes, each traffic stream has its own buffer and is assigned a nominal service rate. The assignment of the nominal rates is static. The actual service rate that buffer i receives is greater than or equal to its nominal rate, depending on the occupancy of the other buffers in this queue. If all the other buffers are backlogged, the actual service rate of buffer i equals its nominal rate, so as to ensure the specified performance guarantee. Otherwise, the actual service rate can be higher than the nominal rate.

However, with the rate based scheduling disciplines, it may not be easy to determine the nominal service rates that can provide the specified quality of service. If the sources are regulated by leaky buckets or have exponentially bounded burstiness, a bound for end-to-end network delay can be derived. (For a discussion of sources regulated by leaky buckets see Zhang et al. cited above and A. Parekh and R. Gallager, A generalized processor sharing approach to flow control in integrated services networks: The multiple node case, IEEE Trans. on Networking, Vol. 2, No. 2, pp. 137–150, 1994; for exponentially bounded burstiness see Yaron et al. cited above.)

With this bound, it is possible to determine the appropriate service rates to satisfy the end-to-end delay requirement of the sources. A CAC algorithm based on this approach can be designed to provide the required end-to-end delay. However, this approach may result in low utilization of the network, leading to inadequate service during temporary congestion.

In such prior art systems, it is possible to carry out a queuing analysis to determine the suitable nominal service rates to be set in the system. However, since the assignment of the nominal service is static in the rate based schemes, it is possible that during a short interval of time, a particular buffer has much higher arrival rate than its nominal service rate. During this temporary congestion, the performance of the overloaded buffer can be very poor. On the other hand, it is difficult to dynamically adjust the nominal service rates because the rates are determined through a complicated queuing analysis. Consequently, the temporarily congested buffer may receive inadequate service, while other, possibly lightly loaded buffers, may receive unnecessary service. This scenario is very possible and, in fact, it has been demonstrated that well-behaved traffic streams at the edge of the network can become very bursty inside the network, leading to temporary congestion. See, e.g., R. Cruz, A calculus for network delay, part I: Network element in isolation, IEEE Trans. on Info. Theory, Vol. 37, No. 1, pp. 114–131, 1991; R. Cruz, A calculus for network delay, part II: Network analysis, IEEE Trans. on Info. Theory, Vol. 37, No. 1, pp. 131–141, 1991; S. Golestani, Congestion-free communication in high-speed packet networks, IEEE Transactions on Communications, Vol. 39, No. 12, pp. 1802–1812, 1991.

Several longer queue first disciplines have also been previously investigated. The continuous-time two-queue longer queue first priority model is analyzed by J. Cohen, A two-queue, one-server model with priority for the longer queue, Queuing Systems, Vol. 2, pp. 261–283, 1987. The bounds on the buffer size for the longest queue first discipline, assuming fluid flow arrival streams, have been investigated by H. Gail, G. Grover, R. Guerin, S. Hantler, Z. Rosberg, and M. Sidi, Buffer size requirements under longest queue first, in IFIP '92, 1992. It is shown by Gail et al. that the longest queue first discipline requires less buffer space to prevent cell losses than the FIFO and round-robin disciplines.

A problem with the prior art rate based schemes is that they consider the input streams in relative isolation. Consequently, a temporarily overloaded traffic stream may not be able to obtain enough bandwidth to remove the backlog quickly, while other streams are hardly affected during the presence of the temporary overload. Such imbalance was accepted in the prior art and, in fact, was sometimes even promoted. For example, Parekh et al. and Zhang et al. argued that the rate based schemes provide fairness to the traffic streams, in that the misbehavior of one class can not degrade the service to other classes. However, such a philosophy can lead to unnecessary degradation in service during situation when a certain classes is temporarily congested while other classes do not require high level of service.

Even if one assumes that all traffic streams are leaky-bucket policed and shaped when they enter the network, it has been suggested (see Cruz and Golestani articles cited above) that they can still be very bursty inside the network. This added burstiness can cause short term overload to some of the buffers to the extent that the arrival rates to the overloaded buffers are higher than their nominal service rates. The prior art rate based schemes cannot respond quickly enough to this temporary overload because they employ isolation among the traffic classes. However, this added burstiness is caused by the multiplexing and demultiplexing operations of the network and is beyond the control of the users. From this point of view, the present inventors believe that it is unfair to penalize well-behaved users that temporarily exhibit burstiness because of the operation of the network.

Consequently, in addition to being very complicated and computational intensive, weighted fair queue algorithms cannot dynamically adapt to varying load conditions. That is, the weights in weighted fair queuing is determined based upon the source characteristics, as indicated in the received call. However, the characteristics may change as the source's transmission interacts with other users. This change cannot be accounted for in the prior art weight fair queuing.

Accordingly, the present invention has been developed to solve the above problems exhibit by the prior art systems.

SUMMARY OF THE INVENTION

The present invention provides a scheduling system which allows adequate service even during temporary congestion, while maintaining the required quality of service.

The inventive scheduling discipline is more explicitly related to the quality of service requirements of the sources, and more responsive to temporary changes in the system's load.

According to the subject invention, the sources are clarified into N classes, so that sources in one class have the same QoS requirements, e.g., cell loss probability. Each class of traffic has its own buffer, for a total of N buffers. Each class i is assigned a positive number $w_i$ for its weight, where i=1, 2, . . . , N. In each cycle the queue length of each buffer is multiplied by its assigned weight, and the buffer having the highest product is served next.

More specifically, the queue length process of the i-th buffer is set to $Q_{i,n}$ in slot n. Let j be the index of the buffer that maximizes $w_i Q_{i,n}$, for i=1, 2, . . . , N, i.e., $$w_j Q_{j,n} = \max_{(1 \leq i \leq N)} w_i Q_{i,n}.$$

The buffer that achieves $\max_{1 \leq i \leq N} w_i Q_{i,n}$ is the most congested buffer in terms of the weighted queue lengths $\{w_i Q_{i,n}\}$. Therefore, in slot n+1, the scheduler transmits a cell from buffer j. If there are k buffers achieving this maximum, then each buffer has a probability of 1/k of being served in slot n+1.

According to the subject invention, it is expected that $$w_i Q_i = w_j Q_j, i \neq j, \qquad (1)$$

where $Q_i$ is the stationary queue length of buffer i. As will be discussed in more detailed below, in the heavy traffic limit, Eqn. (1) becomes asymptotically exact. If all the $w_i$'s are equal, this service discipline reduces to the longest queue first priority discipline. Therefore, the inventive scheduling discipline is called by the inventors weighted longest queue first discipline (abbreviated as WLQF).

The inventive system can be implemented in fast ATM networks, as it can easily and rapidly adapt to varying load conditions. Specifically, since the weight are calculated and set in advance, all that is required by the system is to multiply the weights by the queue length, which-can be done very rapidly.

Additionally, the inventive system implements a novel CAC, which rapidly adapts to temporary congestion and ensures the requested QoS.

DETAILED DESCRIPTION OF THE PREFERRED EMBODIMENTS

Figure 1:
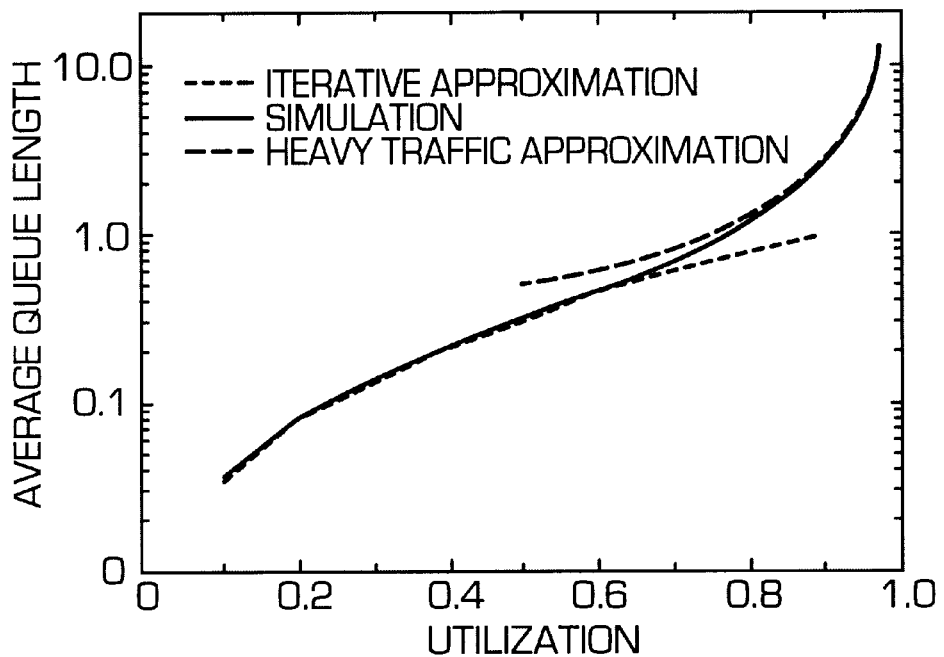
FIG. 1 depicts simulation results of the system according to the present invention, as compared with the results from the iterative approximation and heavy traffic agpproximation, specifically, the average queue length of buffer 1 in an asymmetrical case.

As noted above, the present invention is particularly suitable for high speed ATM networks, so as to provide a network which efficiently routes communications while accounting for the requested QoS. The QoS information is generally carried in the control cell of the transmission, and can be generally specified in terms of loss probability or loss cell rate (e.g., lost cells/total cells in session); cell transfer delay; and cell delay variation. The majority of the discussion provided below, analyzing the inventive system, relates to defining the QoS in terms of cell loss probability, which is an important parameter for many applications. However, it should be appreciated that other parameters may be used instead of, or in addition to, cell loss probability.

According to the inventive system, transmissions over the ATM network is classified according to QoS. Thus, when a call is received, it can be classified to the appropriate class by checking the QoS specified by the customer. To provide the requested service, a novel connection admission control and a novel scheduling discipline are implemented in the network switches. the novel schedule discipline is termed by the inventors: Weighted Longest Queue First service discipline.

The sources can be classified according to various QoS parameters, preferably according to the delay requirement. This helps provide the appropriate service to sources with short tolerance to delay (e.g., audio and video transmission), while providing less costly service to sources who can tolerate delay (e.g., e-mail transmissions). Each traffic class is provided with its own buffer, and each buffer i is assigned a positive number $w_i$ for the weight of buffer i. Then, each period the scheduler multiplies each buffer's weight by its queue length, and transmits a cell from that buffer whose product is highest. That is, the scheduler transmits a packet from the buffer that maximizes $w_i Q_i$ for i=1,2, . . . ,N, where $Q_i$ is the queue length of buffer i at the moment when the scheduler makes a decision about which buffer to serve. Consequently, according to the inventive system the server always serves the most congested buffer in terms of the weighted queue lengths.

The advantage of the inventive WLQF discipline is that it can adapt to temporary overload quickly. This feature ensures that in temporary overloads of one of the buffers, the overloaded buffer receives almost all the service and therefore, losses due to buffer overflows and cell delay variation are much smaller than in other disciplines.

Unlike the prior art, the weight assigned to each buffer is calculated beforehand based on the QoS assigned to that buffer, i.e., not based on the characteristics of the source. This enables fast call acceptance determination, and avoids lengthy calculations which are based on the source's characteristics, but fail to account for deviations in the transmission itself due to the network. In the preferred embodiment, the weight factor is proportional to the cell loss probability of the class assigned to the particular buffer, and inversely proportional to the buffer length.

The weight is also used in a novel CAC algorithm which can rapidly determine call acceptance. Specifically, the CAC determines whether the network can accommodate the QoS requested by the incoming call. When a call is received, the server first determines the arrival rate specified by the source at the time the call is received. Then a first and a second moment of the arrival rate specified by the source is calculated, and a ratio of the second moment to the first moment is obtained. The ratio is compared to a reference value in the form of the sum of all the inverses of the weights. If the ratio is higher than the reference value, it is determined that the network cannot support the requested QoS and the call is rejected.

A transient simulation detailed below shows that one advantage of the inventive WLQF scheduler is that it has smaller variability in the behavior of the maximum queue-lengths. This ensures that in temporary overloads of one of the buffers, the overloaded buffer receives almost all the service and therefore, losses due to buffer overflows are much smaller than in other disciplines. The smaller variability in the behavior of the maximum queue-lengths also implies that WLQF scheduling discipline provides smaller cell delay variation.

The following is a detailed explanation of the manner in which the preferred embodiment has been developed, together with explanations of the various models and approximations used by the present inventors in arriving at the preferred embodiment.

Considering that the buffers have finite capacities and the users specify their desirable QoS, particularly cell loss probabilities, according to the preferred embodiment of the present invention, the weight $w_i$ is chosen as:

$$w_i = \frac{-\ln \epsilon_i}{B_i} \tag{2}$$

where $B_i$ is the size of buffer i and $\epsilon_i$ is the desirable cell loss probability for the class i traffic. Thus, according to the invention, the novel weight factor is proportional to the natural logarithm of the specified cell loss probability, $\epsilon_i$, and inversely proportional to the buffer size. This choice of $w_i$ is based on the heavy traffic limit theorem which is discussed in further detailed below. However, while Eqn. (2) implies that the user's received QoS is proportional to the specified QoS, the inventive WLQF discipline allows more bandwidth sharing among the traffic classes in the sense that the discipline distributes bandwidth to the buffers proportionally to their weighted queue lengths during congestion.

As can be understood from the above, the philosophy towards fairness employed by the present invention is different from that of the prior art such as that disclosed by Parekh et al. and Zhang cited above. According to the WLQF scheduler of the present invention, the bandwidth is shared among classes in such a way that more bandwidth is available to the classes that need it the most. Therefore, the inventive WLQF scheduler can quickly adapt to temporary overloads, and give more service to overloaded buffers during temporary congestion periods. Consequently, according to the inventive scheme, although service to some users may be degraded, it will be degraded proportionally to their specified QoS and only during a temporary congestion. This allows the system to provide the QoS requested without penalizing well-behaved users whose transmission became bursty only due to the network's processing.

The inventors have carried out a transient simulation to study the effect of temporary overload to the performance of the inventive WLQF scheduler and the rate based scheduling schemes. The transient simulation shows that the overloaded buffer has a much smaller buffer occupancy in the WLQF scheduler than in the prior art rate schedulers. This result shows that one advantage of the WLQF scheduler is that it has smaller variability in the behavior of the maximum queue-lengths. This ensures that in-temporary overloads of one of the buffers, the overloaded buffer receives almost all the service and therefore, losses due to buffer overflows are much smaller than in other prior art disciplines. The smaller variability in the behavior of the maximum queue-lengths also implies that WLQF scheduling discipline provides smaller cell delay variation.

In queuing terms, the weighted longest queue first model is described as follows.

1. Time is slotted. Service time is deterministic and equals to one slot.
2. There are N buffers of infinite size served by a single server. Within each buffer, FIFO service discipline is used.
3. There are N types of arrivals to the N buffers. It is assumed that the arrival processes to the N buffers are independent Markov-modulated sources. Let $A_{i,n}$ be the number of arrivals to buffer i in slot n and $M_{i,n}$ be the state of the modulating Markov chain of buffer i (which has state space $\{1, 2, \ldots, K_i\}$) at time n. Then, the conditional transform of the number of arrivals in a slot and the state of the modulating Markov chain is given by $$\sum_{a=0}^{\infty} \Pr(A_{i,n} = a, M_{i,n+1} = k \mid M_{i,n} = j)z^a = g_{jk}^{(i)}(z), 1 \le j, k \le K_i.$$

Let $g_i(z)$ be the $K_i \times K_i$ matrix whose (j,k)-th element is $g_{jk}^{(i)}(z)$, i=1,2, . . . ,N. The matrix $g_i(z)$ is called the kernel of the arrival process. Throughout this paper, boldface letters denote matrices and vectors. The arrivals in slot n are available for service in the next slot.

4. At time n, the scheduler computes $\max_{1 \le i \le N} w_i Q_{i,n}$ and serves an ATM cell from the buffer that achieves this maximum. If two or more buffers achieve this maximum, then they are served with an equal probability.

Let $\pi_i$ denote the invariant probability vector of $g_i(1)$, i.e. $\pi_i g_i(1) = \pi_i$. The WLQF system is stable if $$\sum_{i=1}^{N} \pi_i g_i'(1) e_{K_i} < 1, \tag{3}$$

where $e_{Ki}$ is the $K_i \times 1$ vector whose elements are all 1. For purposes of the following discussion, it is assumed that inequality (3) holds.

In order to find the queue length distribution for the weighted longest queue first discipline according to the present invention, an approximation method has been developed by the present inventors. The approximation method decomposes this complex problem into N separate single-server queues, each with a probabilistic service discipline. Specifically, each single server queue has the same arrival process as the corresponding buffer in the WLQF model. Namely, the arrival process of the i-th queue has kernel $g_i(z)$. The parameter $r_i$ is associate with the i-th single server queue which models the i-th buffer, and the server serves a customer with probability $1-r_i^j$ if there are $j>0$ customers in the queue. With probability $r_i^j$ the server stays idle for a slot. Note that $r_i$ is a real number between 0 and 1 and $r_i^j$ is the j-th power of $r_i$. Therefore, $r_i$ is called the service parameter of queue i. The larger the queue length is, the larger the probability that the server will serve a customer in a slot. Therefore, this fictitious service discipline of the single server queue is consistent with the weighted longest queue first discipline. This type of single server queue is termed probabilistic service queue (PSQ).

First Model: A Single Server Queue with Probabilistic Service Discipline

In this section, an analysis of the discrete-time single server queue with the probabilistic service discipline is provided. The solution obtained in this section is used in the next section to approximate the weighted longest queue first discipline. Since in this section a single queue is discussed, the subscript i which denotes the buffer number is dropped. The arrival process is a Markov-modulated process, i.e., the conditional transform of the number of arrivals in a slot ($A_n$) and the state of its modulating Markov chain $M_n$ (which has state space $\{1, 2, \ldots, K\}$) is given by $$\sum_{a=0}^{\infty} \Pr(A_n = a, M_{n+1} = k \mid M_n = j)z^a = g_{jk}(z),$$

where $1 \le j, k \le K$. Let $g(z)$ be the $K \times K$ matrix in which the (j,k)-th element is $g_{jk}(z)$. Let the stationary distribution of g(1) be denoted by $\pi$. That is, $\pi g(1)=\pi$. Let $C_n$ denote the number of cells in the queue at time n. If $C_n>0$, the server transmits a cell with probability $1-r^{C_n}$ and stays idle for a slot with probability $r^{C_n}$. Note that $r^{C_n}$ denotes the $C_n$-th power of r. The server is idle when $C_n=0$. The number of cells at time n evolves according to $$C_{n+1}=(C_n-S_{n,C_n})^+ + A_n, \qquad (4)$$

where $(x)^+=\max(x,0)$ and the random variable $S_{n,j}=1$ with probability $1-r^j$ and $S_{n,j}=0$ with probability $r^j$. The constant r is called the service parameter of the queue and its range is $0 \leq r<1$. Now the stochastic process $X_n=(C_n, M_n)$ is considered. Clearly, $\{X_n\}$ is an irreducible and aperiodic Markov Chain. The following theorem presents the stability condition of $\{X_n\}$.

Theorem 1: $\{X_n\}$ is stable if $0 \leq r<1$ and $\pi g'(1)e<1$, where e is a K×1 vector whose elements are all 1.

Proof: Let the queue described in Eq. (4) be called queue A. For arbitrary $\epsilon$ such that $0 \leq \epsilon < 1-\pi g'(1)e$, let $m=\min\{i | 1-r^i > 1-\epsilon\}$. Consider queue B whose arrival process has the same distribution as that of queue A. At time n, let the number of cells in queue B be denoted by $C_n^B$. The server of queue B stays idle if $C_n^B \leq m$. If $C_n^B > m$, the server in queue B serves a cell with probability $\epsilon$ and stays idle for a slot with probability $1-\epsilon$. Thus, $C_n^B$ evolves according to $$C_{n+1}^B = \left(C_n^B - S_{n,C_n^B}^B\right)^+ + A_n, \qquad (5)$$

In Eq. (5), the random variable $$S_{n,j}^B = 0$$

with probability 1 if $j \leq m$. Otherwise, $$S_{n,j}^B = 1$$

with probability $1-\epsilon$ and $$S_{n,j}^B = 0$$

with probability $\epsilon$. First, it is shown that $C_n \leq_{st} C_n^B$ for any n by the coupling technique, where $\leq_{st}$ denotes stochastic ordering (See, S. Ross, *Stochastic Processes*. New York: John Wiley & Sons, Inc., 1983.).

To this end, assume that $C_0 \leq C_0^B$ and, for some n, $C_n$ is stochastically less than $C_n^B$, denoted by $C_n \leq_{st} C_n^B$. We couple queue A and queue B by feeding the two queues with the same arrival process $\{A_n\}$. Generate a sequence of independent random variables $\{U_n | n \geq 0\}$ uniformly distributed over [0,1]. We also need to couple the service processes of the two queues in the following manner. For all $n \geq 0$, generate $$S_{n,j} = \begin{cases} 1 \text{ if } U_n \leq 1-r^j \\ 0 \text{ if } U_n > 1-r^j \end{cases}$$

$S_{n,j}^B=0$ if $j \leq m$, and $$S_{n,j}^B = \begin{cases} 1 \text{ if } U_n \leq 1-\epsilon \\ 0 \text{ if } U_n > 1-\epsilon \end{cases}$$

for $j>m$. In this construction, $$S_{n,j}^B \leq S_{n,j}$$

with probability 1. By Proposition 8.2.2 of Ross (cited above), there exist random variables $\tilde{C}_n$ and $\tilde{C}_n^B$, that have the same distribution as $C_n$ and $C_n^B$ respectively and $\tilde{C}_n \leq \tilde{C}_n^B$ with probability 1. In the event that $\tilde{C}_n = \tilde{C}_n^B$, since $$S_{n,j}^B \leq S_{n,j},$$
$$C_{n+1} = \left(\tilde{C}_n - S_{n,\tilde{C}_n}\right)^+ + A_n \leq \left(\tilde{C}_n^B - S_{n,\tilde{C}_n^B}^B\right)^+ + A_n = C_{n+1}^B.$$

In the complementary event, i.e. $\tilde{C}_n < \tilde{C}_n^B$, $$C_{n+1} = \left(\tilde{C}_n - S_{n,\tilde{C}_n}\right)^+ + A_n$$
$$\leq \tilde{C}_n + A_n \text{ (since } S_{n,\tilde{C}_n} \geq 0\text{)}$$
$$\leq \left(\tilde{C}_n^B - 1\right)^+ + A_n$$
$$\leq \left(\tilde{C}_n^B - S_{n,\tilde{C}_n^B}^B\right)^+ + A_n \text{ (since } S_{n,\tilde{C}_n^B}^B \leq 1\text{)}.$$

Therefore, by induction $C_n \leq_{st} C_n^B$ for all n. By W. Szpankowski, Stability Conditions for multidimensional Queuing Systems with Computer Applications, Operations Research, Vol. 36, No. 6, pp. 944–957, 1988, queue A is stable if queue B is stable. By theorem 1 of R. Loynes, The Stability of a Queue with Non-Independent Inter-Arrival and Service Times, Proc. of the Camb. Philos. Soc., Vol. 58, pp. 497–520, 1962, the stability condition of queue B is $\pi g'(1)e<1-\epsilon$. Hence, the stability region of queue A contains $\pi g'(1)e<1-\epsilon$. Since $\epsilon$ is arbitrary, the stability region of queue A is $\pi g'(1)e<1$.

In the discussion that follows, the following notation is used. Let $$p_j(Z) \stackrel{\text{def}}{=} \lim_{n \to \infty} E(Z^{C_n} 1\{M_n = j\}), \, j = 1, 2, \ldots, K, \qquad (6)$$

where $1\{A\}$ denotes the indicator function of event A. Let $p(z)$ be the 1×K vector whose elements are $p_1(z)$, $p_2(z), \ldots, p_K(z)$. It is not difficult to derive the functional equation for $p(z)$ from Eq. (4). We omit this straightforward but tedious derivation and present the following functional equation for $p(z)$ $$p(z)=p(rz)g(z)(z-1)\{zI-g(z)\}^{-1} \qquad (7)$$

where I is the K×K identity matrix and $\{zI-g(z)\}^{-1}$ denotes the inverse matrix of $zI-g(z)$. Note that when r=0, the queuing model described in Eq. (4) reduces to a simple discrete-time single server queue with Markov-modulated arrivals. This model is studied in section 3 of T. Takine, B. Sengupta, and T. Hasegawa, An Analysis of a Discrete-Time Queue for Broadband ISDN with Priorities Among Traffic Classes, IEEE Irans. on Communications, Vol. 42, pp. 1837–1845, February/March/April 1994. Indeed, with r=0, Eq. (7) reduces to Eq. (5) of Takine et al. Define $$\phi(z) \stackrel{\text{def}}{=} g(z)(z-1)\{zI - g(z)\}^{-1}.$$

Substituting Eq. (7) repeatedly into itself j times, we obtain $$p(z) = p(r^{j+1}z)\phi(r^j z)\phi(r^{j-1}z) \ldots (rz)\phi(z).$$

Since $\phi(z) \to I$ as $z \to 0$, the last equation implies $$p(z) = p(0) \prod_{i=0}^{\infty} \phi(r^i z), \tag{8}$$

where $$\prod_{i=0}^{\infty} \phi(r^i z) \stackrel{\text{def}}{=} \lim_{i \to \infty} \phi(r^i z) \ldots \phi(rz)\phi(z).$$

Note that Eq. (8) provides the solution to p(z) if p(0) is known. We now find p(0). Rewrite Eq. (8) as $$p(z)\{zI - g(Z)\} = p(0)\left(\prod_{i=1}^{\infty} \phi(r^i z)\right) g(z)(Z-1) \stackrel{\text{def}}{=} c(Z) \tag{9}$$

By Cramer's rule, the solution of Eq. (9) is $$p_j(Z) = \frac{\det[ZI - g(Z)]_j}{\det[ZI - g(Z)]}, j = 1, 2, \ldots, K, \tag{10}$$

where matrix $\{zI - g(z)\}_j$ is the K×K matrix obtained by replacing the j-th row of $zI-g(z)$ by c(z). In Eq. (10), there are K unknown constants, namely $p_0(0)$, $p_1(0)$, ..., $p_K(0)$. These unknowns can be found by first finding the K roots of $\det[zI-g(z)]=0$ within or on the unit circle. Let these roots be denoted by $\xi_1, \xi_2, \ldots, \xi_K$. For any simple root $\xi_i$ (i=1, 2, ..., K), $$\det[\xi_i I - g(\xi_i)]_j = 0, \tag{11}$$

since $p_j(z)$ is analytic in $|z|<1$ and continuous in $|z| \leq 1$. Eq. (11) give a linear relationship for the unknowns $p_0(0), p_1(0), \ldots p_K(0)$. We note that each simple only gives one independent equation because from Eq. (10)

$$\frac{\det[\xi_i I - g(\xi_i)]_j}{\det[\xi_i I - g(\xi_i)]_k} = \frac{p_j(\xi_i)}{p_k(\xi_i)} = \text{constant}$$

For a multiple root $\xi_i$ with multiplicity m, it is required that the l-th derivative of $\det[zI-g(z)]_j$ evaluated at $\xi_i$ must all be zero for l=0,1, ..., m−1. We note that one of these K roots is 1 and for this root, the equation is obtained by an application of L'Hospital's rule. This yields $$p_j(1) = \frac{\frac{d}{dz}\det[ZI - g(Z)]_j\Big|_{Z \to 1^-}}{\frac{d}{dz}\det[ZI - g(Z)]\Big|_{Z \to 1^-}} = \pi_j,$$

where we recall that $\pi$ is the stationary distribution of g(1) and $\pi_j$ is the j-th element of $\pi$. We thus obtain a system of K linear equations with K unknowns. This system of equations must have a unique solution as we assume that the queuing system is stable. It remains to show that $\det[zI-g(z)]=0$ has exactly K roots on or within the unit circle. This fact is presented in the following theorem.

Theorem 2 $\det[zI-g(z)]=0$ has exactly K roots on or within the unit circle.

This theorem is a special case of theorem 3 of R. Izmailov, D.-S. Lee, and B. Sengupta, *Design and Analysis of a Congestion-Free Overlay on a Conventional High-Speed Network*. Submitted for publication. The reader is referred to that publication for the proof. After the unknown vector p(0) is obtained, p(z) is completely determined. The expected queue length can be obtained by differentiating p(z) and setting z=1. We omit the detail of this straightforward procedure.

Finally, we prove a lemma for the monotonicity of PSQ's. This lemma will be used in the next section to prove the convergence of the iterative approximation method. Consider two PSQ's labeled as PSQ 1 and PSQ 2 with service probabilities $r_1$ and $r_2$, respectively. Assume that the arrival processes of two PSQ's have the same distribution. Let the service parameter of the two queues be $r_1$ and $r_2$. Denote the queue length process of $PSQ_i$ by $\{(C_n^{(i)}\}$ and the stationary queue length by $C_\infty^{(i)}$.

Lemma 1 If $r_1 \geq r_2$, then $C_\infty^{(i)} \geq_{st} C_\infty(2)$.

Proof: We shall prove this lemma by using the inductive argument and the stochastic coupling technique. The queue length process of $PSQ_i$ satisfies $$C_{n+1}^{(i)} = \left(C_n^{(i)} - S_{C_n^{(i)}}^{(i)}\right)^+ + A_n, i = 1, 2,$$

where random variable $S_j^{(i)}=1$ with probability $1-r_i^j$ and $S_j^{(i)}=0$ with probability $r_i^j$. Assume that $C_0^{(1)} \leq C_0^{(2)}$ and $C_n^{(1)} \geq_{st} C_n^{(2)}$ for some n. We couple the two queues by feeding them with the same arrival process. Generate a sequence of independent random variables $\{U_n | n \geq 0\}$ uniformly distributed over [0,1]. Construct $$S_{n,j}^{(i)} = \begin{cases} 1 \text{ if } U_n \leq 1 - r_i^j \\ 0 \text{ if } U_n > 1 - r_i^j \end{cases}$$

for i=1,2 and j≥1. Since $r_1 \geq r_2$, $$S_{n,j}^{(1)} \leq S_{n,j}^{(2)}$$

with probability 1 for all j. By Ross, there exist random variables $\tilde{C}_n^{(1)}$ and $\tilde{C}_n^{(2)}$ that have the same distribution $C_n^{(1)}$ and $C_n^{(2)}$, and $\tilde{C}_n^{(1)} \geq \tilde{C}_n^{(2)}$ with probability 1. In the event that $\tilde{C}_n^{(1)} = \tilde{C}_n^{(2)}$ $$C_{n+1}^{(1)} = \left(\tilde{C}_n^{(1)} - S_{n,\tilde{C}_n^{(1)}}^{(1)}\right)^+ + A_n \geq \left(\tilde{C}_n^{(2)} - S_{n,\tilde{C}_n^{(2)}}^{(2)}\right)^+ + A_n = C_{n+1}^{(2)}$$

In the complementary event, i.e., $\tilde{C}_n^{(1)} > \tilde{C}_n^{(2)}$, $$C_{n+1}^{(1)} = \left(\tilde{C}_n^{(1)} - S_{n,\tilde{C}_n^{(1)}}\right)^+ + A_n$$

$$\leq \tilde{C}_n^{(1)} + A_n \left(\text{since } S_{n,\tilde{C}_n^{(1)}} \geq 0\right)$$

$$\leq \left(\tilde{C}_n^{(2)} - 1\right)^+ + A_n$$

-continued $$\leq \left(\tilde{C}_n^{(2)} - S_{n,\tilde{C}_n^{(2)}}^{(2)}\right)^+ + A_n \quad \left(\text{since } S_{n,\tilde{C}_n^{(2)}}^{(2)} \leq 1\right)$$

By induction, $C_n^{(1)} \geq_{st} C_n^{(2)}$ for all n. Since stochastic ordering is preserved under weak convergence D. Stoyan, *Comparison Methods for Queues and Other Stochastic Models*, Berlin: John Wiley & Sons, Inc, 1983, it follows that $C_\infty^{(1)} \geq_{st} C_\infty^{(2)}$. Since the stationary queue lengths $C_\infty^{(1)}$ and $C_\infty^{(2)}$ do not depend on the initial queue lengths, the claim of the lemma still holds if $C_0^{(1)} \geq C_0^{(2)}$ does not hold.

To investigate the inventive discipline, the present inventors developed a method of analysis which approximates the queue length distribution. The system is decomposed into N single server queues with probabilistic service discipline. The method is an iterative one, which is prove hereinbelow to be convergent, by using stochastic dominance arguments and the coupling technique. This method works well for low to medium utilization.

For high utilization, a heavy traffic limit theorem is proved for the inventive weighted longest queue first service discipline. Using the theory of Riemann's boundary value problems, it is shown below that the limit of $(1-\rho)w_i Q_i$ as $\rho \to 1$ are equal for all i with probability 1, where $\rho$ is the overall system utilization. Based on the heavy traffic limit theorems, a heavy traffic approximation and a novel call admission control (CAC) is derived.

Model 2: Iterative Approximation

This section details the inventors' approximation method for the weighted longest queue first discipline. As mentioned in the introduction, the method approximates the N-buffer WLQF system by N PSQ's. Each PSQ receives arrivals from the same arrival process to the corresponding buffer in the WLQF system. The unknowns that need to be determined are the service parameters of the PSQ's. These unknowns are found by an iterative procedure. We denote by $Q_i$, i=1, 2, ..., N, the stationary version of the queue length of the i-th buffer in the WLQF system. Denote the stationary version of the queue length of the i-th PSQ in the k-th iteration by $C_{i,k}$. Let the service parameter of the i-th PSQ be $r_{i,k}$ in the k-th iteration. For any $0 \leq r_{i,k} < 1$, the solution of the expected queue length $EC_{i,k}$ is given above in the discussion of a single server queue.

ALGORITHM 1

1. Let $r_{i,1}=0$ for i=1,2, ...,N. Let k=1.
2. For i=1 to N, compute $EC_{i,k}$ using the method detailed above regarding a single server queue.
3. For i=1 to N, do;

3.1 $r_{i,k+1} = \max\left\{ \left(\frac{EC_{i,k}}{1+EC_{i,k}}\right)^{w_i/w_j} \;\middle|\; 1 \leq j \leq N, j \neq i \right\}.$ 4. If $$\sum_{i=1}^{N} |r_{i,k+1} - r_{i,k}| < \epsilon,$$

stop. Otherwise, set k=k+1 and go to step 2.

In step 3 of the algorithm, we construct the new service parameters for iteration k+1. We now provide an explanation for this step. The WLQF scheduler serves a cell from buffer i, whose queue length is x, if $Q_j < \lfloor xw_i/w_j \rfloor$ for all $j \neq i$ and the notation $\lfloor y \rfloor$ denotes the integral part of y. It is intuitive to set $1 - r_{i,k+1}^x$ to be equal to this probability. Hence, $$1 - r_{i,k+1}^x = \Pr\left(Q_j < \left\lfloor \frac{xw_i}{w_j} \right\rfloor, j \neq i\right)$$

$$\approx \prod_{\substack{1 \leq j \leq N \\ j \neq i}} \Pr\left(Q_j < \left\lfloor \frac{xw_i}{w_j} \right\rfloor\right) \quad (12)$$

$$\approx \prod_{\substack{1 \leq j \leq N \\ j \neq i}} \left(1 - \eta_{j,k}^{\lfloor xw_i/w_j \rfloor}\right), \left(\text{where } \eta_{j,k} \stackrel{\text{def}}{=} \frac{EC_{j,k}}{1+EC_{j,k}}\right) \quad (13)$$

$$= 1 - \sum_{\substack{1 \leq j \leq N \\ j \neq i}} \eta_{j,k}^{\lfloor xw_i/w_j \rfloor} + \sum_{\substack{1 \leq j \leq N \\ j \neq i}} o(\eta_{j,k}) \quad (14)$$

In Eq. (12), we approximate the joint probability by assuming independence among $Q_j$'s. In Eq. (13), $Q_j$ is not known to us and we approximate the distribution of $Q_j$ by a geometric distribution with the same mean as that of $C_{j,k}$. In Eq. (14), the notation o(z) means that $o(z)/z \to 0$ as $z \to 0$. Ignoring the third term on the right of Eq. (14), we have $$1 - r_{i,k+1}^x \approx 1 - \sum_{\substack{1 \leq j \leq N \\ j \neq i}} \eta_{j,k}^{\lfloor xw_i/w_j \rfloor}$$

From this relation, we approximate $$r_{i,k+1} \approx \left(\sum_{\substack{1 \leq j \leq N \\ j \neq i}} \eta_{j,k}^{\lfloor xw_i/w_j \rfloor}\right)^{1/x} \quad (15)$$

$$\to \max\left\{\eta_{j,k}^{w_i/w_j} \;\middle|\; 1 \leq j \leq N, j \neq i\right\} \text{ as } x \to \infty.$$

The reason that we approximate $r_{i,k+1}$ by taking $x \to \infty$ in Eq. (15) is that tail distributions have strong influence on the queuing performance. In the next theorem, we prove that algorithm 1 is convergent. Note that by convergence of an algorithm, we mean that the stopping criteria of the algorithm will be satisfied within finite execution time.

Theorem 3 If the WLQF system is stable, then algorithm 1 converges.

Proof: We need to show that $\{r_{i,k}\}$ is a convergent sequence in k for i=1,2, ...,N. Since inequality (3) holds, by theorem 1, every individual PSQ that approximates the corresponding buffer of the WLQF model is stable if $0 \leq r_{i,k} < 1$ for i=1,2, ..., N and all $k \geq 1$. We use induction to prove that $r_{i,k}$ is a non-decreasing and bounded sequence in k for all i=1,2, ..., N and $r_{i,k} < 1$. It is clear that $0 = r_{i,1} \leq r_{i,2} < 1$ for all i. Assume that $r_{i,k+1} < 1$ for all i and some k. By lemma 1, $C_{i,k} \leq C_{i,k+1}$ for all i, which implies that $EC_{i,k} < EC_{i,k+1} < \infty$. Hence, $\eta_{i,k+1} \leq \eta_{i,k+2} <$ for all i. Obviously, from Eq. (15), $r_{i,k+1} \leq r_{i,k+2} < 1$ for all i. By induction, $r_{i,k} \leq r_{i,k+1} < 1$ for all i and all k. Hence, $\{r_{i,k}\}$ is a non-decreasing and bounded sequence. Therefore, $\{r_{i,k}\}$ is convergent for all i.

Although we have shown that the sequence $\{r_{i,k}\}$ is convergent for all i=1,2, ..., N, the limit can be 1, in which case the corresponding PSQ is unstable. To avoid this ill condition, we modify algorithm 1. We need to compute the total expected queue lengths of the WLQF system, i.e., $$\sum_{i=1}^{N} EQ_i.$$

We recall that the arrival processes to the N buffers of the WLQF system are independent Markov-modulated processes. Clearly $M_n = (M_{1,n}, M_{2,n}, ..., M_{N,n})$ is a Markov chain that modulates the aggregated arrival process. The Markov chain $M_n$ has K states, where $$K = \prod_{i=1}^{N} K_i,$$

and kernel $g_1(z) \oplus g_2(z) \oplus \ldots \oplus g_N(z)$, where the symbol $\oplus$ denotes the Kronecker product. The total queue length of the WLQF system is the same as that of a single server queue with the same arrival process modulated by $M_n$. This single server queue can be solved by using the result in section 2 with r=0. We define $$q \stackrel{\text{def}}{=} \sum_{i=1}^{N} EQ_i.$$

ALGORITHM 2

1. Compute q. Let $r_{i,1}=0$ and $y_{i,1}=0$ for $i=1,2,\ldots,N$. Let k=1.
2. For i=1 to N, compute $EC_{i,k}$ using the results provided in the single server queue section above.
3. if $$\sum_{i=1}^{N} EC_{i,k} < q - \epsilon_1,$$

then
   3.1. For i=1 to N, do 3.1.1. $r_{i,k+1} = \max\left\{\left(\frac{EC_{i,k}}{1+EC_{i,k}}\right)^{w_i/w_j} \middle| 1 \leq j \leq N, j \neq i\right\}.$ 3.1.2. $y_{i,k+1} = r_{i,k}$;
   3.2 If $$\sum_{i=1}^{N} |r_{i,k+1} - r_{i,k}| < \epsilon,$$

stop. Otherwise, set k=k+1 and go to step 2.
4. Else if $$\sum_{i=1}^{N} EC_{i,k} > q + \epsilon_1,$$

then
   4.1. For i=1 to N, do 4.1.1.

$$r_{i,k+1} = (1-2^{-k})y_{i,k} + 2^{-k}\max\left\{\left(\frac{EC_{i,k}}{1+EC_{i,k}}\right)^{w_i/w_j} \middle| 1 \leq j \leq N, j \neq i\right\};$$

4.1.2. $y_{i,k+1} = y_{i,k}$
   4.2. Set k=k+1 and go to step 2.
5. Else stop.

Theorem 4 If the WLQF system is stable, then algorithm 2 is convergent and $$\liminf_{k \to \infty} \sum_{i=1}^{N} EC_{i,k} \leq q.$$

Proof: If $$\sup_{k \geq 1} \sum_{i=1}^{N} EC_{i,k} \leq q.,$$

by the argument used in theorem 3, $$\sum_{i=1}^{N} EC_{i,k}$$

is non-decreasing and bounded. Therefore, $$\lim_{k \to \infty} \sum_{i=1}^{N} EC_{i,k} \leq q.$$

If $$\sup_{k \geq 1} \sum_{i=1}^{N} EC_{i,k} > q,$$

let $$S = \left\{k \middle| \sum_{i=1}^{N} EC_{i,k} < q\right\}.$$

We now show that $$\sum_{i=1}^{N} EC_{i,k}$$

is non-decreasing for $k \in S$. Let $$k_0 = \min\left\{k \middle| \sum_{i=1}^{N} EC_{i,k} > q\right\}.$$

Clearly, by the argument used in theorem 3, $$\sum_{i=1}^{N} EC_{i,k}$$

is non-decreasing for $k \leq k_0 - 1$. Let $k_1$ be any positive integer such that $$\sum_{i=1}^{N} EC_{i,k_1} < q$$

and $$\sum_{i=1}^{N} EC_{i,k_1+1} > q.$$

Define $$k_2 = \min\left\{k \left| \sum_{i=1}^{N} EC_{i,k} < q, k > K_1 + 1 \right.\right\}.$$

We now show that $k_2 < \infty$. Suppose that $k_2 = \infty$, i.e., $$\sum_{i=1}^{N} EC_{i,k} > q$$

for all $k > k_1$. But, $y_{i,k} = y_{i,k_1+1}$ for all $i$ and $k = k_1+2, k_1+3, \ldots$ and, therefore, $$r_{i,k+1} = (1 - 2^{-k})y_{i,k} + 2^{-k}\max\left\{\left(\frac{EC_{i,k}}{1+EC_{i,k}}\right)^{w_i/w_j} \middle| 1 \le j \le N, j \ne i\right\}$$

$$= (1 - 2^{-k})y_{i,k_1+1} + 2^{-k}\max\left\{\left(\frac{EC_{i,k}}{1+EC_{i,k}}\right)^{w_i/w_j} \middle| 1 \le j \le N, j \ne i\right\}$$

$$\to y_{i,k_1+1} = r_{i,k_1} \text{ as } k \to \infty.$$

This contradicts the assumption that $$\sum_{i=1}^{N} EC_{i,k_1} < q.$$

Hence, $k_2 < \infty$. We now show $r_i, k_2 \ge r_{i,k_1}$ for all $i$. Again, by the fact that $y_{i,k} = y_{i,k_1+1}$ for $k = k_1+2, k_1+3, \ldots, k_2-1$, $$r_{i,k_2} = (1 - 2^{-k_2+1})y_{i,k_2-1} +$$

$$2^{-k_2+1}\max\left\{\left(\frac{EC_{i,k_2-1}}{1+EC_{i,k_2-1}}\right)^{w_i/w_j} \middle| 1 \le j \le N, j \ne i\right\}$$

$$\ge y_{i,k_2-1} = y_{i,k_1+1} = r_{i,k_1}.$$

By lemma 1, $EC_{i,k1} \le EC_{i,k2} < q$ and $k_1, k_2 \in S$. It implies that $$\lim_{k \in S} \sum_{i=1}^{N} EC_{i,k} \le q.$$

Since S contains all the values of k such that $$\sum_{i=1}^{N} EC_{i,k} < q,$$

the limit point of the sub-sequence $$\left\{\sum_{i=1}^{N} EC_{i,k} \middle| k \in S\right\}$$

is the lower limit of the entire sequence.
Model 3: Heavy Traffic Limit Theorems In this section, we shall prove a heavy traffic limit theorem for the WLQF system and a heavy traffic limit theorem for the FIFO single server queue. These two heavy traffic limit theorems are used to derive a heavy traffic approximation for the queue lengths of the inventive WLQF system.

Let $$g(z_1, z_2, \ldots z_N) \stackrel{\text{def}}{=} g_1(z_1) \otimes g_2(z_2) \otimes \cdots \otimes g_n(z_n).$$

The stationary probability distribution of $\{M_n\}$ is given by $\pi = \pi_1 \oplus \pi_2 \oplus \ldots \oplus \pi_N$. Let $M_\infty$ denote the stationary version of the Markov chain $\{M_n\}$. In order to drive the system to heavy traffic, consider a sequence of matrix generating functions indexed by $\rho$, namely $G(\rho, z_1, z_2, \ldots, z_N)$. Let $G(\rho, 1, 1, \ldots, 1) = g(1, 1, \ldots, 1)$ for all $0 \le \rho \le 1$, and $$\pi \sum_{i=0}^{N} \frac{\partial}{\partial Z_i} G(\rho, Z_1, Z_2, \ldots, Z_N) \bigg|_{Z_j=1, j=1,2,\ldots,N} e_K = \rho.$$

From now on, we shall drop the subscript of $e_K$ as it is clear that in this section the vector $e$ is of dimension $K \times 1$. We introduce a short-hand notation $$G(\rho, Z) \stackrel{\text{def}}{=} G(\rho, z_1, z_2, \ldots, z_N).$$

From the WLQF service discipline, we can derive the following equation $$\vec{E}\left(\prod_{i=1}^{N} Z_i^{Q_i}\right) = \tag{16}$$

$$\sum_{j=1}^{N} \sum_{1 \le k_1 < k_2 < \ldots < k_j \le N} \vec{E}\left(\prod_{i=1}^{N} Z_i^{Q_i} 1\{w_{k_1}Q_{k_1} = w_{k_2}Q_{k_2} = \ldots = w_{k_j}Q_{k_j} > w_l Q_l,$$

$$\forall l \ne k_m, m = 1, 2, \ldots, j\} \sum_{i=1}^{j} \frac{G(\rho, Z)}{jZ_{k_i}},$$

where $\vec{E}(\ )$ denotes $1 \times K$ vectors of expectations. More specifically, $$\vec{E}\left(\prod_{i=1}^{N} z_i^{Q_i}\right)$$

and $$\vec{E}\left(\prod_{i=1}^{N} z_i^{Q_i} 1\{w_{k_1}Q_{k_1} = w_{k_2}Q_{k_2} = \ldots = w_{k_j}Q_{k_j} > w_l Q_l, \right.$$

$$\forall l \ne k_m, m = 1, 2, \ldots, j\}$$

denote the $1 \times K$ vectors whose w-th elements are $$E\left(\prod_{i=1}^{N} z_i^{Q_i} 1\{M_\infty = w\} \text{ and }\right.$$

-continued $$\vec{E}\left(\prod_{i=1}^{N} Z_i^{Q_i} 1\{w_{k_1}Q_{k_1} = w_{k_2}Q_{k_2} = \ldots = w_{k_j}Q_{k_j} > w_l Q_l, \right.$$
$$\left. \forall\, l \neq k_m, m=1,2,\ldots,j, M_\infty = w\}\right)$$

respectively. Eq. (16) is derived by reasoning in the following way. At the beginning of a slot, if there are j buffers (buffers $k_1, k_2, \ldots, k_j$) achieving the maximum $\max_{1 \leq m \leq N}\{w_m Q_m\}$, i.e.

$$w_{k_1}Q_{k_1} = w_{k_2}Q_{k_2} = \ldots w_{k_j}Q_{k_j} > w_l Q_l, \forall\, l \neq k_m, m=1,2,\ldots,j,$$

the WLQF scheduler serves a customer from buffer $k_i$ (i=1, 2, ..., j) with probability 1/j. Division by $z_{k_i}$ means that a customer from buffer $k_i$ is served. Multiplication by $G(\rho, z)$ takes care of the new arrivals and the transition of the modulating Markov chain $\{M_n\}$. Since the events described in Eq. (4) are mutually exclusive, Eq. (16) follows. From the fact that the events in Eq. (4) are mutually exclusive, we can derive $$\vec{E}\left(\prod_{i=1}^{N} Z_i^{Q_i}\right) = \qquad (17)$$

$$\sum_{j=1}^{N} \sum_{1 \leq k_1 < k_2 < \ldots < k_j \leq N} \vec{E}\left(\prod_{i=1}^{N} Z_i^{Q_i} 1\{w_{k_1}Q_{k_1} = w_{k_2}Q_{k_2} = \ldots = w_{k_j}Q_{k_j} > w_l Q_l, \forall\, l \neq k_m, m=1,2,\ldots,j\}\right)$$

Substituting Eq. (17) into Eq. (16) yields $$\sum_{j=1}^{N} \sum_{1 \leq k_1 < k_2 < \ldots < k_j \leq N} \vec{E}\left(\prod_{i=1}^{N} Z_i^{Q_i} 1\{w_{k_1}Q_{k_1} = w_{k_2}Q_{k_2} = \ldots = w_{k_j}Q_{k_j} > w_l Q_l, \forall\, l \neq k_m, m=1,2,\ldots,j\}\right)\left(\prod_{i=1}^{N} Z_i I - \sum_{i=1}^{j}\prod_{l \neq k_i} Z_l \frac{G(\rho, Z)}{j}\right) = 0$$

Eq. (18) is the functional equation that the unknown functions are related. We assume that as $\rho \to 1^-$, $(1-\rho)Q_1$ approaches random variable $Q^*_i$, for i=1,2, ..., N. Also assume that $$\vec{E}\left(e^{-(1-\rho)\sum_{i=1}^{N} s_i Q_i}\right) \to \vec{E}\left(e^{-\sum_{i=1}^{N} s_i Q^*_i}\right) \text{ as } \rho \to 1^-.$$

Replacing $z_i$ by $\exp(-(1-\rho)s_i)$ in Eq. (18) and let $\rho \to 1^-$, we obtain $$\vec{E}\left(e^{-\sum_{i=1}^{N} s_i Q^*_i}\right)(I - g(1,1,\ldots,1)) = 0,$$

which implies that $$\vec{E}\left(\exp\left(-\sum_{i=1}^{N} s_i Q^*_i\right)\right) = f(s_1, s_2, \ldots, s_N)\pi.$$

for some scalar function $f(s_1, s_2, \ldots, s_N)$. This means that $Q^*_1, Q^*_2, \ldots, Q^*_N$ are independent of $\{M_n\}$. Therefore, $$\vec{E}\left(e^{-\sum_{i=1}^{N} s_i Q^*_i} 1\{w_{k_1}Q_{k_1} = w_{k_2}Q_{k_2} = \ldots = w_{k_j}Q_{k_j} > w_l Q_l, \right.$$
$$\left. \forall\, l \neq k_m, m=1,2,\ldots,j\}\right)$$

equals $$E\left(e^{-\sum_{i=1}^{N} s_i Q^*_i} 1\{w_{k_1}Q_{k_1} = w_{k_2}Q_{k_2} = \ldots = w_{k_j}Q_{k_j} > w_l Q_l, \right.$$
$$\left. \forall\, l \neq k_m, m=1,2,\ldots,j\}\right)\pi.$$

Using L'Hospital's rule, we can determine that the limit as $\rho$ approaches $1^-$ of:

$$\frac{e^{-\sum_{i=1}^{N} s_i(1-\rho)} - \frac{1}{j}\sum_{i=1}^{j} \pi e^{-\sum_{l \neq k_i} s_l(1-\rho)} G(\rho, e^{-s_1(1-\rho)}, e^{-s_2(1-\rho)}, \ldots, e^{-s_N(1-\rho)}) e}{1-\rho}$$

Equals:

$$(-1)\left(\sum_{i=1}^{N} s_i - \frac{1}{j}\sum_{i=1}^{j}\sum_{l \neq k_i} s_l - \frac{1}{j}\sum_{i=1}^{j}\left(h_0 + \sum_{l=1}^{N} h_l s_l\right)\right). \qquad (19)$$

In the derivation of Eq. (19), we have used $$\pi \frac{\partial}{\partial \rho} G(\rho, e^{-s_1(1-\rho)}, e^{-s_2(1-\rho)}, \ldots, e^{-s_N(1-\rho)})\bigg|_{\rho \to 1} e = \pi \frac{\partial}{\partial \rho} G(\rho, Z_1, Z_2, \ldots, Z_N)\bigg|_{\rho \to 1, Z_i=1, i=1,2,\ldots,N} e +$$

$$\sum_{j=1}^{N} s_j \pi \frac{\partial}{\partial Z_j} G(\rho, Z_1, Z_2, \ldots, Z_N)\bigg|_{\rho \to 1, Z_i=1, i=1,2,\ldots,N} e$$

$$\stackrel{\text{def}}{=} h_0 + \sum_{j=1}^{N} h_j s_j.$$

Clearly, $h_j \neq 0$ for $j=1,2,\ldots,N$. Now pre-multiply and post-multiply Eq. (18) by $\pi/(1-\rho)$ and e respectively and let $\rho \to 1^-$. Using Eq. (19), we obtain $$\sum_{j=1}^{N} \sum_{1 \le k_1 < k_2 < \ldots < k_j \le N} E$$

$$\left(e^{-\sum_{i=1}^{N} s_i Q_i^*} 1\{w_{k_1} Q_{k_1} = w_{k_2} Q_{k_2} = \ldots = w_{k_j} Q_{k_j} > w_l Q_l,\right.$$

$$\left.\forall l \ne k+m, m=1,2,\ldots,j\}\right)\left(\frac{1}{j}\sum_{i=1}^{j} s_{k_i} - \sum_{i=1}^{N} h_i s_i - h_0\right) = 0.$$

We now show that $w_i Q^*_i, w_j Q^*_j$, $i \ne j$, with probability 1. Without loss of generality, we show that $W_1 Q^*_1 = w_2 Q^*_2$. Setting $s_3 = s_4 = \ldots = S_N = 0$, $s_1 = (u+v)w_1$ and $s_2 = (u-v)w_2$ in Eq. (20), where $\Re u \le 0$ and $\Re v = 0$. Rearranging the terms that have the event $w_{Q1} \ge w_2 Q_2$ in the indicator function on the left hand side and the terms that have $w_1 Q_1 < w_2 Q_2$ in the indicator function in the right hand side, we obtain the following equation, i.e. for $\Re v = 0$, $$\sum_{j=2}^{N} \sum_{\substack{k_1=1,k_2=2 \\ 3=k_3<k_4<\ldots<k_j \le N}} E\left(e^{-u(w_1 Q_1^* + w_2 Q_2^*) - v(w_1 Q_1^* - w_2 Q_2^*)} 1\{w_{k_1} Q_{k_1} = \right. \tag{21}$$

$$w_{k_2} Q_{k_2} = \ldots = w_{k_j} Q_{k_j} > w_l Q_l, \forall l \ne k_m, m=1,2,$$

$$\left.\ldots, j\}\right)\left((u+v)w_1\left[\frac{1}{j} - h_1\right] + (u-v)w_2\left[\frac{1}{j} - h_2\right] - h_0\right) -$$

$$\sum_{j=1}^{N-2} \sum_{3 \le k_1 < k_2 < \ldots < k_j \le N} E\left(e^{-u(w_1 Q_1^* + w_2 Q_2^*) - v(w_1 Q_1^* - w_2 Q_2^*)} 1\{w_{k_1} Q_{k_1} = \right.$$

$$w_{k_2} Q_{k_2} = \ldots = w_{k_j} Q_{k_j} > w_l Q_l, \forall l \ne k_m,$$

$$\left.m=1,2,\ldots,j, w_1 Q_1 \ge w_2 Q_2\}\right)(h_0 +$$

$$h_1[(u+v)w_1] + h_2[(u-v)w_2]) =$$

$$-\sum_{j=1}^{N} \sum_{2=k_1<k_2<\ldots<K_j \le N} E\left(e^{-u(w_1 Q_1^* + w_2 Q_2^*) - v(w_1 Q_1^* - w_2 Q_2^*)} 1\{W_{k_1} Q_{k_1} = \right.$$

$$W_{k_2} Q_{k_2} = \ldots = W_{k_j} Q_{k_j} > W_l Q_l,$$

$$\left.\forall l \ne k_m, m=1,2,\ldots,j\}\right)\left(-h_1[(u+v)w_1] + \right.$$

$$\left.(u-v)w_2\left[\frac{1}{j} - h_2\right] - h_0\right) +$$

$$\sum_{j=1}^{N-2} \sum_{3 \le k_1 < k_2 < \ldots < k_j \le N} E\left(e^{-u(w_1 Q_1^* + w_2 Q_2^*) - v(w_1 Q_1^* - w_2 Q_2^*)}\{w_{k_1} Q_{k_1} = \right.$$

$$w_{k_2} Q_{k_2} = \ldots = w_{k_j} Q_{k_j} > w_l Q_l, \forall l \ne k_m,$$

$$\left.m=1,2,\ldots,j, w_1 Q_1 < w_2 Q_2\}\right)(h_0 +$$

$$h_1[(u+v)w_1] + h_2[(u-v)w_2]).$$

Denote the function on the left hand side of Eq. (21) by $\phi(u,v)$ and the function on the right hand side by $\phi(u,v)$. Clearly, $\phi(u,v)$ is analytic in $\Re u > 0$ and $\Re v > 0$, and continuous in $\Re u \ge 0$ and $\Re v \ge 0$. This is because in the event described in the indicator function on the left hand side of Eq. (21), $w_1 Q^*_1 \le w_2 Q^*_2$. Similarly, $\phi(u,v)$ is analytic in $\Re u > 0$ and $\Re v < 0$, and continuous in $\Re u \ge 0$ and $\Re v \le 0$. On the imaginary axis $\Re v = 0$, $\phi(u,v) = \phi(u,v)$ for any $\Re u \ge 0$. Therefore, Eq. (21) is a Riemann boundary value problem on the complex plane (see F. Gakhov, *Boundary Value Problems*, New York: Dover Publication, Inc., 1966). This boundary value problem can be solved easily. By the generalized Liouville theorem $$\varphi(u,v) = \phi(u,v) = \sum_{i=o}^{n} a_i(u) v^i, \tag{22}$$

for some integer $n \ge 0$ and some functions $a_i(u)$, $i = 0, 1, \ldots, n$, analytic in $\Re u > 0$ and continuous in $\Re u \ge 0$. We now show that $w_1 Q^*_1 = w_2 Q^*_2$ with probability 1. Assume otherwise. Because $$E(e^{-u(w_1 Q_1^* + w_2 Q_2^*) - v(w_1 Q_1^* - w_2 Q_2^*)} 1\{w_1 Q_1 > w_2 Q_2\}) \to 0 \text{ as } v \to +\infty$$

$$E(e^{-u(w_1 Q_1^* + w_2 Q_2^*) - v(w_1 Q_1^* - w_2 Q_2^*)} 1\{w_1 Q_1 < w_2 Q_2\}) \to 0 \text{ as } v \to -\infty$$

it follows that $$\phi(u,v) \to a_0(u) \text{ as } v \to -\infty$$

$$\phi(u,v) \to a_0(u) + a_1(u)v \text{ as } v \to \infty$$

and $$a_1(u) = \sum_{j=2}^{N} \sum_{\substack{k_1=1,k_2=2, \\ 3 \le k_3 < k_4 < \ldots < k_j \le N}} E$$

$$\left(e^{-u(w_1 Q_1^* + w_2 Q_2^*)} 1\{w_{k_1} Q_{k_1} = w_{k_2} Q_{k_2} = \ldots = w_{k_j} Q_{k_j} > w_l Q_l,\right.$$

$$\left.\forall l \ne k_m, m=1,2,\ldots,j\}\right)\left(w_1\left(\frac{1}{j}-h_1\right) - w_2\left(\frac{1}{j}-h_2\right)\right) +$$

$$\sum_{j=1}^{N-2} \sum_{3 \le k_1 < k_2 < \ldots < k_j \le N} E I\left(e^{-u(w_1 Q_1^* + w_2 Q_2^*)}\{w_{k_1} Q_{k_1} = \right.$$

$$w_{k_2} Q_{k_2} = \ldots = w_{k_j} Q_{k_j} > w_l Q_l, \forall l \ne k_m,$$

$$\left.m=1,\ldots,j, w_1 Q_1 = w_2 Q_2\}\right)(-h_1 w_1 + h_2 w_2).$$

If $w_1 \ne w_2$ or $h_1 \ne h_2$, then $a_1(u) \ne 0$. It implies that $\phi(u,v) = a_0(u)$ and $\phi(u,v) = a_0(u) + a_1(u)v$. This contradicts the generalized Liouville theorem in Eq. (22). If $w_1 = w_2$ and $h_1 = h_2$, then $a_1(u) = 0$. It implies that $\phi(u,v) = \phi(u,v) = a_0(u)$. Hence, $\phi(u,v)$ and $\phi(u,v)$ are independent of $v$, which contradicts the assumption that $w_i Q^*_i$ does not equal $w_2 Q^*_2$ with probability 1. Therefore, we have proven the following theorem.

Theorem 5 With probability 1, $$w_i Q^*_i = w_j Q^*_j, \ 1 \le i,j \le N. \tag{23}$$

The total number of customers in the WLQF system equals the total number of customers in the FIFO single server queue with the same arrival processes, since the WLQF discipline is work conserving. Denote the stationary version of the total number of customers in the FIFO single server queue by V. Assume that $(1-\rho)V$ converges to random variable $V^*$ as $\rho \to 1^-$ and $$E(e^{-(1-\rho)sV} 1[M_\infty = w]) \xrightarrow{\rho \to 1^-} E(e^{-sV^*} 1[M_\infty = w]).$$

Let $\sigma(s)$ be the $1 \times K$ vector whose w-th element is $E(\exp(-sV^*) 1\{M_{28} = w\})$. A direct consequence of theorem 5 is the following corollary.

Corollary 1

-continued $$\vec{E}(e^{-sQ_1^*}) = \sigma\left(\frac{s\sum_{j=1}^{N} w_j}{w_1}\right),$$

where $\vec{E}(\exp(-sQ^*_1))$ denotes the 1×K vector whose j-th element is $E(\exp(-sQ^*_1)1([M_{28}=j])$.

Let $$R(\rho, z) \stackrel{\text{def}}{=} G(\rho, z, z, \ldots, z).$$

In the following theorem we characterize σ(s).

Theorem 6

$$\sigma(s) = \frac{2s\pi}{\pi \frac{d^2}{d\rho^2} R(\rho, e^{-(1-\rho)s}) e \Big|_{\rho=1} - s^2}.$$

Proof: The transform of V satisfies Eq. (7) with r=0 and g(z) replaced by R(ρ,z), i.e., $$p(z)=p(0)R(p,z)(z-1)\{zI-R(\rho,z)\}^{-1}, \qquad (25)$$

Replace $z=e^{-(1-\rho)s}$ in Eq. (25) and let $\rho \to 1^-$. We obtain $$\sigma(s)(I-g(1,1,\ldots,1))=0,$$

which implies σ(s)=σ(s)π for some scalar function σ(s). This means that V* is independent of the modulating Markov chain $\{M_n\}$. We rewrite Eq. (25) with $z=e^{-(1-\rho)s}$ as follows:

$$p(e^{-(1-\rho)s})\{e^{-(1-\rho)s}I-R(\rho,e^{-(1-\rho)s})\}=p(0)R(\rho,e^{-(1-\rho)s}(e^{-(1-\rho)s}-1), \quad (26)$$

Differentiating Eq. (26) two times with respect to ρ and letting $\rho \to 1^-$, we obtain Eq. (24). Corollary 2 If the arrival process is a Markov-modulated Poisson process with rates $\lambda_1, \lambda_2, \ldots, \lambda_K$, where $$\sum_{i=1}^{K} \lambda_i \pi_i = 1,$$

then V* is exponentially distributed and its transform is given by $$\sigma(s) = \frac{\pi}{1 + \frac{s}{2}\sum_{i=1}^{K} \lambda_i^2 \pi_i} \qquad \text{Eqn. (27)}$$

Proof: Since the arrival process is a Markov-modulated Poisson process, $$R(\rho, Z) = \begin{pmatrix} e^{\rho\lambda_1(Z-1)} & 0 & 0 & \cdots & 0 \\ 0 & e^{\rho\lambda_2(Z-1)} & 0 & \cdots & 0 \\ \vdots & 0 & \ddots & \vdots & \vdots \\ \vdots & \vdots & \ddots & \ddots & \vdots \\ 0 & 0 & \cdots & 0 & e^{\rho\lambda_k(Z-1)} \end{pmatrix} g(1,1,\ldots,1).$$

Clearly, $$\pi \frac{\partial}{\partial z} R(\rho, z) e \Big|_{z=1} = \rho,$$

because $$\sum_{i=1}^{K} \lambda_i \pi_i = 1.$$

Now $$\frac{d^2}{d\rho^2}(\pi R(\rho, e^{-(1-\rho)s})e)\Big|_{\rho \to 1^-} = 2s + s^2 + s^2 \sum_{i=1}^{K} \lambda_i^2 \pi_i$$

Substituting the above result into Eq. (24) immediately gives us Eq. (27). Notably, since $\lambda_i$ is the instantaneous arrival rate, then $$\rho = \sum_{i=1}^{K} \lambda_i \pi_i,$$

the first moment of the arrival rate, and $$\sum_{i=1}^{K} \lambda_i^2 \pi_i$$

is the second moment of the arrival rate.

The CAC Algorithm

Based on corollaries 1 and 2, we can easily develop a heavy traffic approximation for the average queue length of buffer i:

$$E(Q_i 1\{M_{i,\infty} = j\}) \approx \frac{(\pi_i)_j \sum_{i=1}^{K} \lambda_i^2 \pi_i}{2(1-\rho)} \frac{1}{\left(w_i \sum_{k=1}^{N} \frac{1}{W_k}\right)},$$

where $(\pi_i)_j$ is the j-th element of the vector πi and $M_{1,\infty}$ is the stationary version of $\{M_{i,n}\}$. The tail of the queue length distribution is given by $$\Pr(Q_i > b) = \exp\left(\frac{-b}{\frac{\sum_{i=1}^{K} \lambda_i^2 \pi_i}{2(1-\rho)} \left(w_i \sum_{k=1}^{N} \frac{1}{W_k}\right)}\right) \qquad (28)$$

We now explain how Eq. (2) is derived. In the real system in which the size of buffer i is $B_i$ and the required cell loss probability is less than or equal to $\epsilon_i$, the cell loss probability can be approximated using Eq.(28). That is, substitute $b=B_i$ into Eq.(28) and require that $\Pr(Q_i>B_i)=\epsilon_i$. It is easy to see that this procedure gives $w_i=-v\ln\epsilon_i/B_i$ for some constant v. Therefore, we choose $w_i=-v\ln\epsilon_i/B_i$. Based on this choice of $w_i$ and the fact that the heavy traffic approximation provides an upper bound for the queuing performance (see the next section), we can develop an efficient simple CAC algorithm which is very simple to implement. The CAC accepts a new call if $$\ln \Pr(Q_i > B_i) = \frac{-B_i w_i \sum_{k=1}^{N} \frac{1}{w_k}}{\frac{\sum_{l=1}^{K} \lambda_l^2 \pi l}{2(1-\varrho)}}$$

$$= \frac{\sum_{k=1}^{N} \frac{-B_k}{\ln \epsilon_k}}{\frac{\sum_{l=1}^{K} \lambda_l^2 \pi l}{2(1-\varrho)}} \ln \epsilon_i \leq \ln \epsilon_i$$

where the values of $\rho$, $\lambda_l$ and $\pi_l$ have taken the new call into consideration. Simplifying the above inequality, we accept a new call if $$\sum_{k=1}^{N} \frac{-B_k}{\ln \epsilon_k} \geq \frac{\sum_{l=1}^{K} \lambda_l^2 \pi l}{2(1-\varrho)}$$

The sum on the left-hand side of the equation is calculated prior to receiving the call and is preferably fixed. The value is basically the sum of the inverse of the weights of the N classes. That is, the left hand side can be written as:

$$\frac{\text{Buffer Size}}{\ln QoS_{(requested)}}$$

The value of the right-hand side is calculated when the call is received. The enumerator of the right-hand side of the equation is the second moment of the instantaneous arrival rate, while the denominator is a function of the first moment of the instantaneous arrival rate, i.e., $\rho$ is the utilization, which is the first moment of the arrival rate. The right-hand side can be basically written as:

$$\frac{\text{Second Moment of Arrival Rate}}{1 - \text{First Moment of Arrival Rate}}$$

Wherein the denominator value $(1-\rho)$ can be approximated as the ratio of remaining bandwidth over the total band width.

Thus, the right-hand side is computed for each newly received call, and the call is rejected if the calculated value is higher than the predetermined reference value of the left-hand side of the equation.

Numerical Results

In this section, we present some numerical results. In this first example, we consider a three-buffer WLQF model with $(w_1, w_2, w_3) = (1/5, 1/3, 1/2)$. The arrivals of buffer 1 are generated by a Poisson process with mean $\rho/3$. The arrival processes of the other two buffers are Markov-modulated Poisson processes with kernels $$g_2(Z) = \begin{pmatrix} e^{(Z-1)\varrho/3} & 0 \\ 0 & e^{2(z-1)\varrho/3} \end{pmatrix} \begin{pmatrix} 0.99 & 0.01 \\ 0.80 & 0.20 \end{pmatrix} \quad \text{Eqn. (29)}$$

and $$g_3(Z) = \begin{pmatrix} e^{(Z-1)\varrho/3} & 0 & 0 \\ 0 & e^{2(z-1)\varrho/3} & 0 \\ 0 & 0 & e^{(Z-1)\varrho} \end{pmatrix} \begin{pmatrix} 0.99 & 0.01 & 0 \\ 0.80 & 0.15 & 0.05 \\ 0 & 0.99 & 0.01 \end{pmatrix} \quad (30)$$

Figure 2:
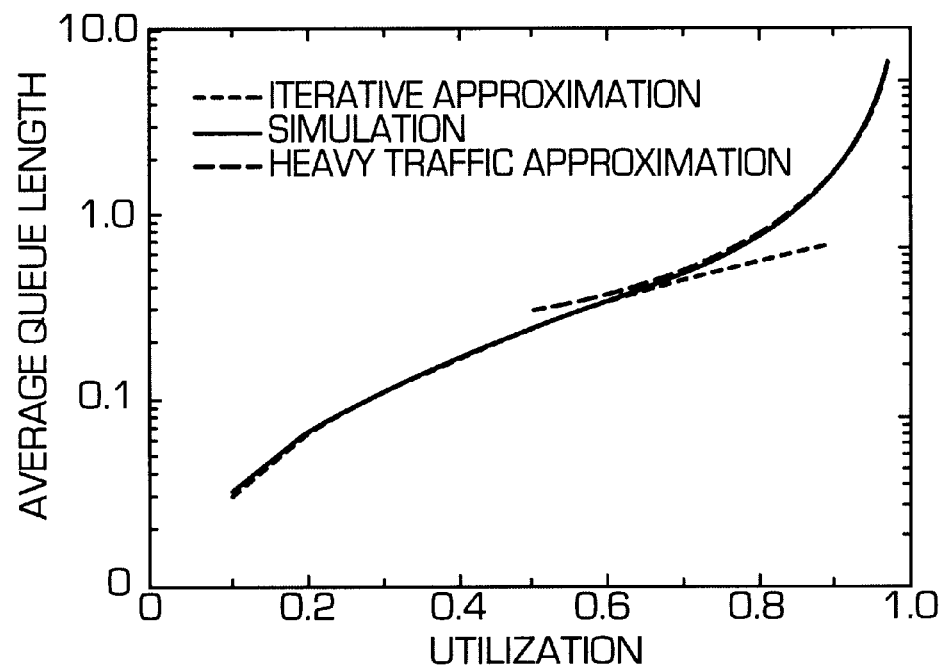
FIG. 2 depicts the simulation results of FIG. 1, as compared with the results from the iterative approximation and heavy traffic approximation, specifically, the average queue length of buffer 2 in an asymmetrical case.
Figure 3:
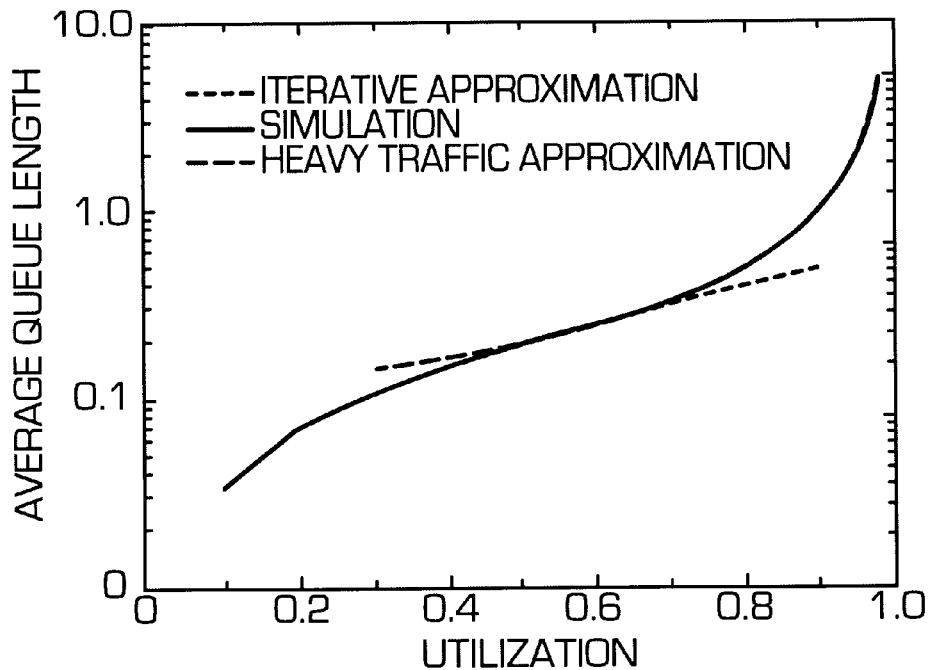
FIG. 3 depicts the simulation results of FIG. 1, as compared with the results from the iterative approximation and heavy traffic approximation, specifically, the average queue length of buffer 3 in an asymmetrical case.

The invariant vectors of $g_2(1)$ and $g_3(1)$ are $\pi_2 = (0.98765, 1.2345 \times 10^{-2})$ and $\pi_3 = (0.98703, 1.2338 \times 10^{-2}, 6.2313 \times 10^{-4})$ respectively. Note that $\rho/3 + \pi_2 g'_2(1) e_2 + \pi_3 g'_3(1) e_3 = \rho$. The average queue lengths of the three buffers as functions of the utilization $\rho$ are plotted in FIGS. 1, 2 and 3. In these figures, we show the simulation result compared with the results from the iterative approximation and heavy traffic approximation. We make the simulation time long enough that the confidence intervals are very small. Hence, we do not show the confidence intervals in the result. We can see that the heavy traffic approximation provides very accurate results down to about 60%. The iterative approximation (algorithm 2) provides accurate results for utilization up to about 70%. For above 70%, the iterative approximation starts to seriously under-estimate the mean queue length. This is because the iterative approximation ignores the correlation present in the WLQF system. First, in Eq. (12) we have assumed that $Q_1, Q_2, \ldots, Q_N$ are independent. Clearly, they are not. Second, in the PSQ models that we use to approximate the WLQF system, we have assumed that in successive slots, the server serves or not serves a customer according to independent random variables. That is, we have assumed that $\{S_n\}$ in Eq. (4) is a sequence of independent random variables. In contrast, the probability that a WLQF scheduler serves customers successively from a particular buffer is highly correlated. As the utilization is higher, the correlation becomes more influential to the queuing performance. Therefore, we expect that the performance of the iterative approximation becomes worse as the utilization becomes higher.

In the second example, we consider a larger symmetrical system with six buffers. In this system, wits are all equal, so that the WLQF discipline reduces to the longest queue first discipline. Furthermore, we assume that $$g_i(Z) = \begin{pmatrix} e^{(Z-1)\varrho/6} & 0 \\ 0 & e^{(z-1)\varrho/3} \end{pmatrix} \begin{pmatrix} 0.99 & 0.01 \\ 0.80 & 0.20 \end{pmatrix}, i = 1, 2, \ldots, 6. \quad (31)$$

Figure 4:
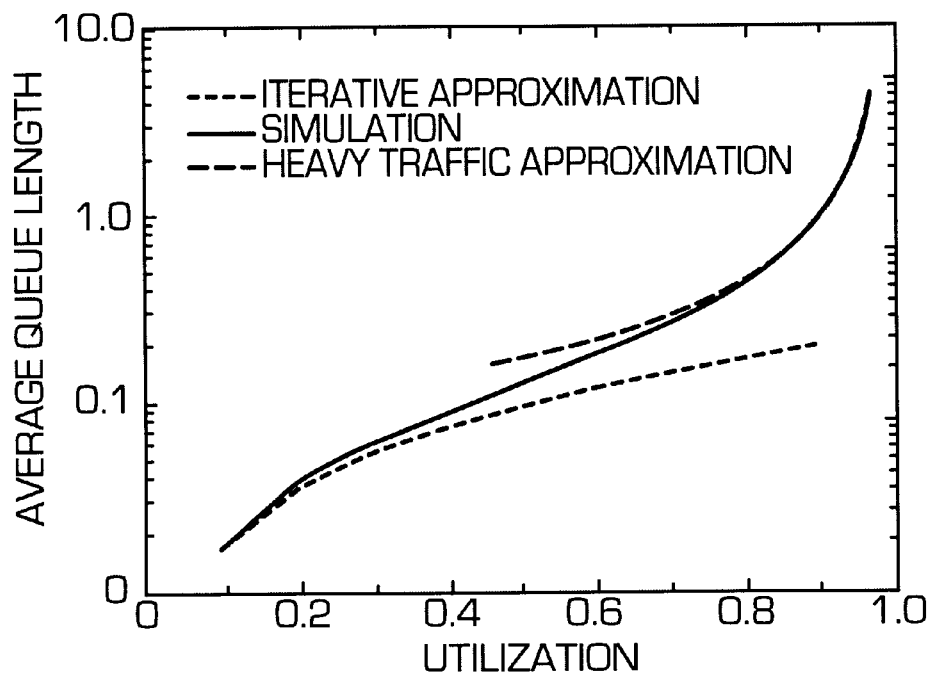
FIG. 4 depicts the average queue lengths results of another simulation, as compared with the iterative approximation and the heavy traffic approximation.

The invariant vector of $g_i(1)$ is $\pi_i = (0.9876, 1.2345 \times 10^{-2})$ for all i. Again, notice that $6\pi_i g'_i(1) e_2 = \rho$. The results of simulation, the iterative approximation and the heavy traffic approximation are presented in FIG. 4. The heavy traffic approximation is quite accurate for utilization higher than 60%. The iterative approximation is accurate for utilization lower than 60%.

Figure 5:
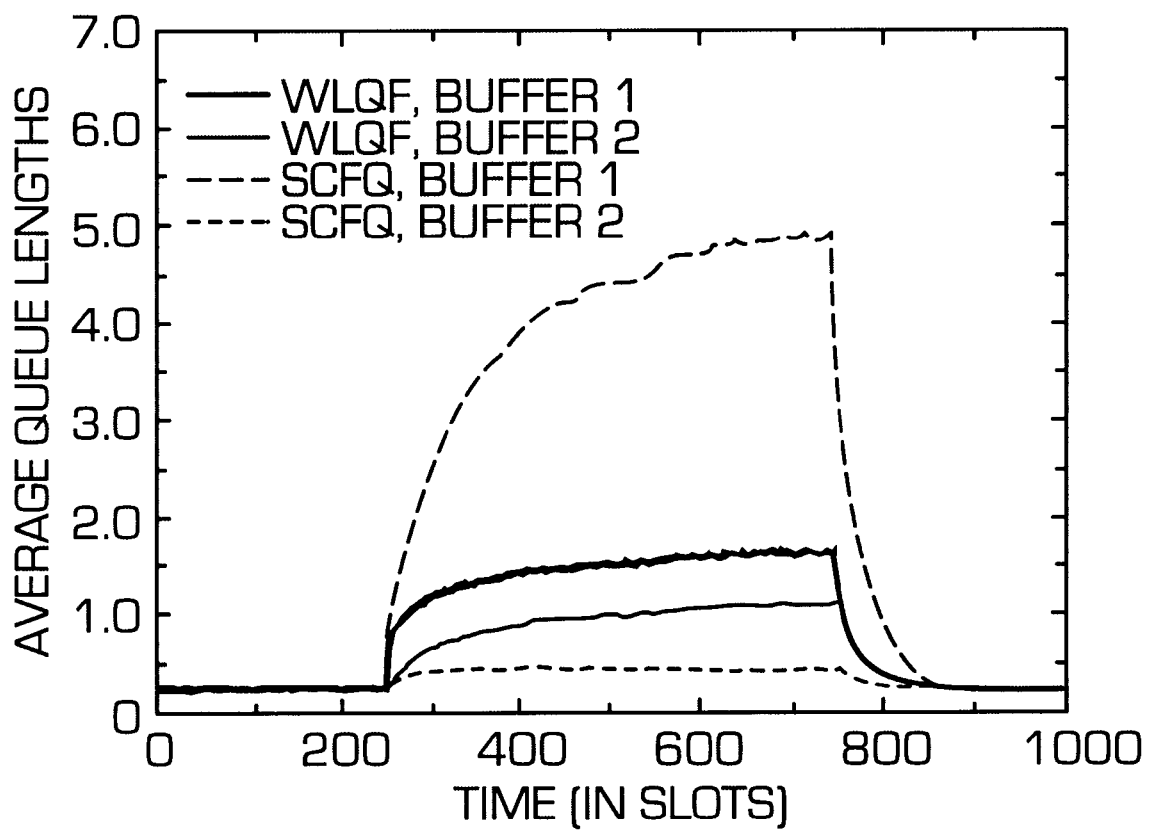
FIG. 5 depicts a comparison of the transient performance of a two-buffers system using the inventive WLQF and the prior art the self-clock fair queuing model.

We conduct a simulation to study the transient behavior of the WLQF discipline and the rate based scheduling discipline. We simulate the six-buffer symmetrical WLQF model. The kernel of the arrival processes is given in Eq. (31). We simulate the model for a long period of time so that at time zero the model is in its steady state. At time 250 (in slots), the arrival rate of buffer 1 is tripled and at time 750 (in slots) the arrival rate of buffer 1 returns to its original value before the overload. The system utilization is 70% before the sudden overload and is 93.3% during the overload. We duplicate this simulation 5000 times and the average queue length of buffer 1 is drawn in FIG. 5. We than repeat the same transient simulation setup for the queuing model, except that the WLQF discipline is replaced by the self-clock fair queuing (SCFQ) (see, S. Golestani, A Self-Clocked Fair Queuing Scheme for Broadband Applications, in IEEE Infocom '94, pp. 5c.1.1–5c.1.11, 1994). The average queue length of buffer 1 in the self-clock fair queuing model is drawn in FIG. 5 for comparison. We can see that with the WLQF scheduling discipline buffer 1 has a much smaller average queue length during the overload period than with the SCFQ discipline.

We also study the impact of the sudden overload caused by buffer 1 to the performance of the other buffers. Notice that buffers 3 to 6 have the same performance as that of buffer 2. Therefore, we only show the average queue length of buffer 2 as a function of time in FIG. 5. As expected, the average queue length of buffer 2 in the WLQF scheme is higher than that of the SCFQ scheme, because the SCFQ scheme employs more strict isolation among the input streams. However, the degradation of the performance of buffer 2 caused by the overloading of buffer 1 is quite minor in the WLQF scheme, compared with the advantage that buffer 1 has received. This result show that one advantage of the WLQF scheduler is that it has smaller variability in the behavior of the maximum queue-lengths. This ensures that in temporary overloads of one of the buffers, the overloaded buffer receives almost all the service and therefore, losses due to buffer overflows are much smaller than in other disciplines. This implies that both the cell loss probability and cell delay variation are smaller in the WLQF system than the rate based systems.

As can be understood from the above description, the inventive system provides service to various classes of transmissions, based upon the sources QoS requirement. The system can easily and rapidly adapt to temporary overloads without degrading the service. Additionally, the inventive system implements an efficient connection admission control which rapidly determines whether the QoS requested by the source for an incoming call can be supported by the network.

What is claimed is:

1. A method for regulating transmission in a communication network having a plurality of buffers, each of a given length, said method comprising the steps of:

calculating a weight factor for each of said buffers;

applying the weight factor to a queue length of a respective buffer to obtain a weighted queue for each of said buffers;

transmitting data from the buffer having the highest weighted queue.

2. The method of claim 1, wherein said weight factor is proportional to a requested quality of service of data in a respective buffer and inversely proportional to the buffer length of the respective buffer.

3. The method of claim 1, wherein said weight factor is proportional to a requested cell loss probability of data in a respective buffer and inversely proportional to the buffer length of the respective buffer.

4. The method of claim 1, wherein said weight factor is defined by the equation:

$$w_i = \frac{-\ln \epsilon_i}{B_i}$$

wherein $B_i$ defines the size of buffer i of said plurality of buffers and $\epsilon_i$ defines the a requested cell loss probability for data in buffer i.

5. A method for regulating acceptance of a new call in a communication network comprising the steps of:

receiving an arrival rate specification from a source;

obtaining a first moment of said arrival rate;

obtaining a second moment of said arrival rate;

obtaining a ratio of the second moment to the first moment;

comparing said ratio to a predetermined reference value and rejecting the new call if the ratio is higher than the reference value.

6. The method of claim 5, wherein said network is provided with a plurality of buffers and wherein said reference value is proportional to buffer length of said buffers and inversely proportional to requested quality of service of data in said buffers.

7. The method of claim 6, wherein said reference value is obtained by summing the ratios of buffer length to requested quality of service for each of said buffers.

8. The method of claim 6, wherein said reference value is obtained by summing the ratios of buffer length to requested cell loss probability for each of said buffers.

* * * * *